June 6, 1961 W. E. REED 2,986,929
PRESSURE RATIO INDICATOR AND CONTROLLER
FOR VARIABLE AREA NOZZLE
Filed April 22, 1957 3 Sheets-Sheet 1

INVENTOR
WENDELL G. REED

Strauch, Nolan & Neale
ATTORNEYS

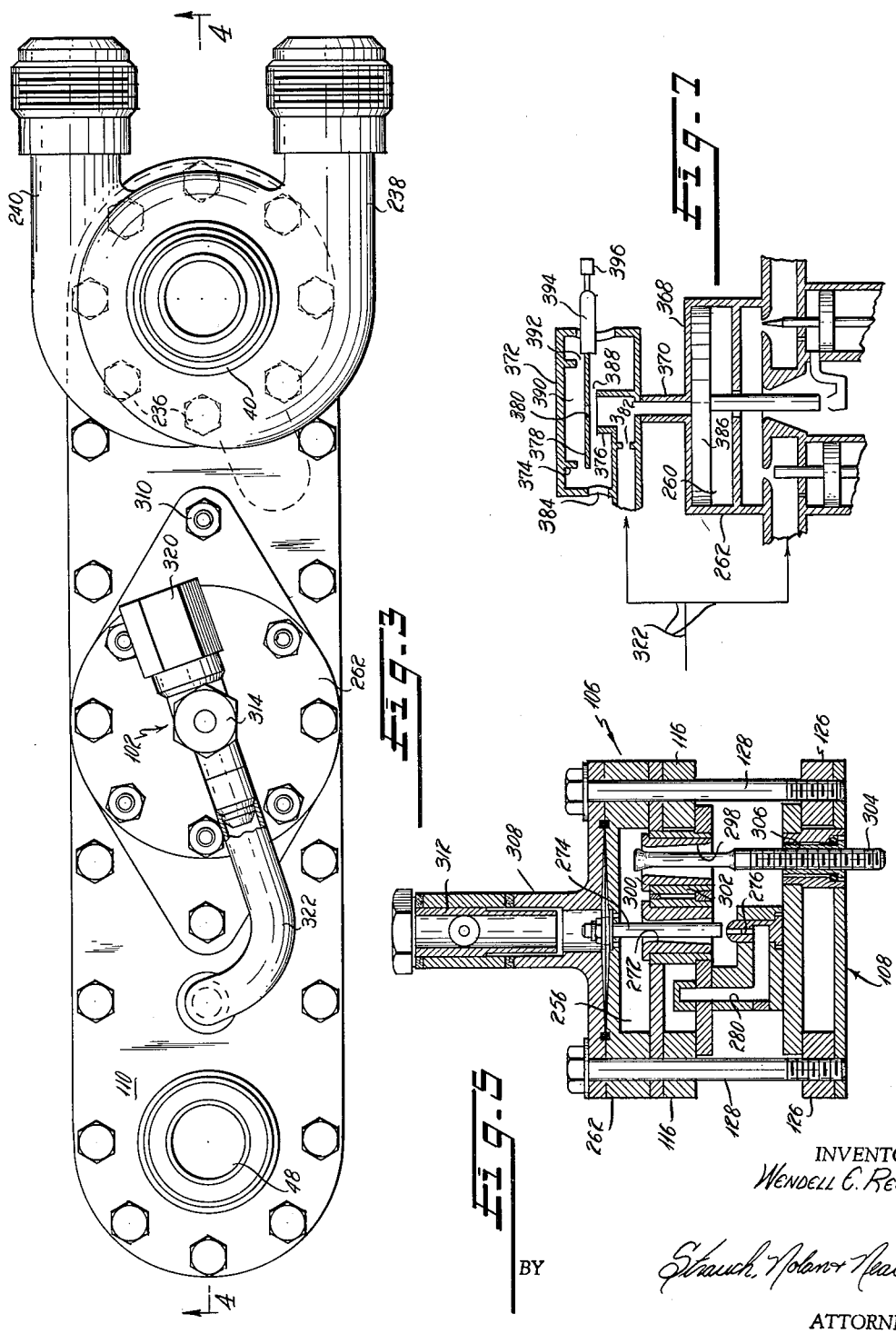

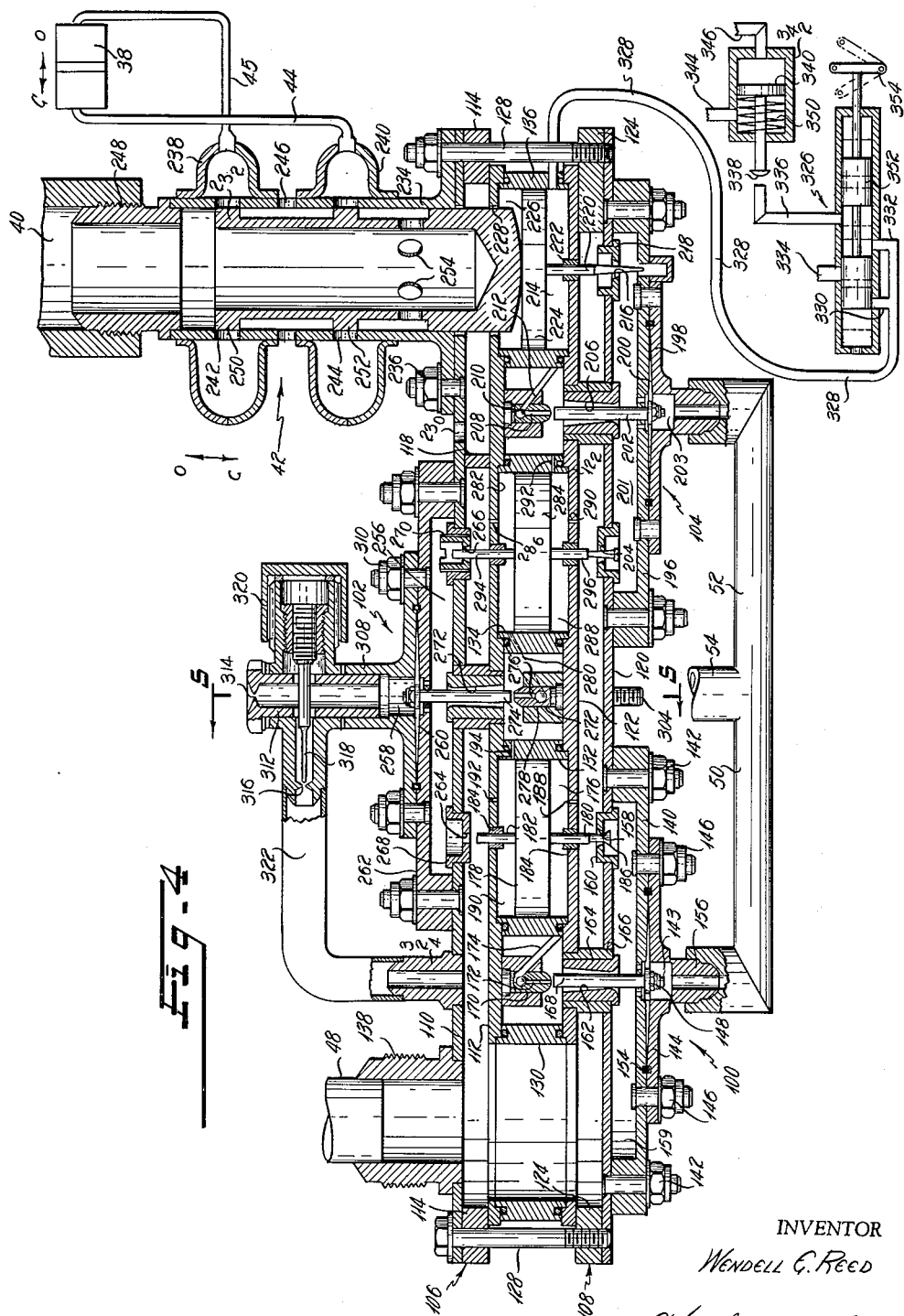

United States Patent Office 2,986,929
Patented June 6, 1961

2,986,929
PRESSURE RATIO INDICATOR AND CONTROLLER FOR VARIABLE AREA NOZZLE
Wendell E. Reed, Chula Vista, Calif., assignor to Solar Aircraft Company, San Diego, Calif., a corporation of California
Filed Apr. 22, 1957, Ser. No. 654,253
1 Claim. (Cl. 73—116)

This invention relates to pressure responsive mechanisms for sensing, indicating and controlling pressure ratios and to pressure responsive systems for controlling the position of a variable nozzle of a turbojet engine.

The systems which comprise the invention are particularly useful in connection with controlling the position of the nozzle of a turbojet engine. One of the principal components of the system is of broader utility and may be used in any environment where it is desired to sense, indicate or control the ratio between two fluid pressures.

As is well known in the art the initiation or cessation of afterburning is accompanied by rapid changes of considerable magnitude in the pressures within the engine. Unless the position of the nozzle which controls the propulsion jet is corrected substantially instantaneously when the pressure changes occur, damage or destruction to the engine or the aircraft may result. The present invention not only provides for such nozzle actuation but is also effective to continuously adjust the position of the nozzle during afterburning to maintain an optimum turbine pressure ratio. The invention also includes a device responsive to variations in the overall engine compression ratio to vary the schedule of turbine pressure ratio to assure optimum performance of the engine despite variations in the speed of the engine or aircraft, compressor efficiency, altitude, pressure and temperature.

Further, in order to reduce the violence of the afterburner ignition, the system of the present invention includes a control element which automatically partially opens the jet nozzle when ignition of the afterburner is imminent.

In accordance with the invention in its preferred form the entire apparatus for generating the control signal which actuates the power mechanism for moving the variable nozzle is pneumatic. The nozzle operating mechanism may be pneumatic, hydraulic or electric as desired.

The advantages of using pneumatic pressure ratios in preference to other control media and parameters are many. A turbojet engine is basically a pneumatic device and its cycle performance can be most effectively described in terms of cycle pressure ratios. The system is so constructed that minor leakage of the actuating fluid, which is air bled from the compressor, does not adversely affect the operation of the system. Further, leakage does not involve a loss of a reservoir of actuating fluid as in the case of a hydraulic system and even breakage of a pipe in the present system presents no fire hazard as might be caused under similar circumstances in the case of a hydraulic system. Since leakage is of minor significance the design of seals is less critical and the sealing material is not necessarily limited to resilient materials which are temperature limited. Storage tanks, pumps and power supplies normally required for electrical or hydraulic systems are eliminated. The source of fluid in the pneumatic system is assured automatically as long as the engine is operating. Further, the use of air as the operating fluid for the system permits operation in a high temperature or nuclear radiation environment with a simple, rugged yet highly accurate control mechanism. The present invention provides a compact integrated package consisting of easily replaceable "capsules" each of which is a complete operable element of the control system.

The individual control elements which comprise the overall nozzle control system are also of novel construction and form an important aspect of the present invention. The control units are pressure responsive mechanisms which provide an output signal in the form of a mechanical displacement which is a function of the ratio of two pressures supplied to the unit. In their preferred form each control unit comprises a metallic diaphragm mounted between two pressure chambers, the diaphragm being displaced from its normal neutral position when the pressures in the two chambers are unequal. The fluids, the ratio of the pressures of which is to be sensed, indicated or controlled are delivered to the two chambers, at least one of which is a flow chamber having inlet and outlet openings in the form of orifices. The orifices, when choked, establish in the flow chamber a pressure which bears a predetermined relation to the pressure supplied to the flow chamber inlet.

A control rod which is attached to and movable with the diaphragm, is utilized to control the displacement of a power amplifying element which is preferably a pneumatically operated piston and may also be a diaphragm or a bellows. The control units are completed by a needle movable with the power amplifying element which varies the area of one of the flow chamber orifices in a direction to equalize the pressure in the two chambers. The mechanism is so arranged that the power element continues to be displaced so long as the diaphragm and control rod are displaced from their neutral positions and comes to rest when it occupies a displaced position which is a function of the ratio of the two input pressures. The power element thus effectively amplifies the comparatively weak movements of the diaphragm to increase the sensitivity of the unit and to permit it to operate nozzle actuators and other loads without error. The power element also minimizes the range of movement of the diaphragm thus permitting the use of a metallic diaphragm to permit the successful operation of the control unit in high temperature environments which have precluded the use of the prior temperature sensitive diaphragms constructed of rubber or similar material.

Three control units of this type are combined in a unique manner in the nozzle control system of the present invention. One control unit functions as a turbine pressure ratio sensor and is associated with a power element which directly controls the actuator for the jet engine nozzle. The second unit controls the scheduling of the turbine pressure ratio as a function of the overall engine compression ratio to provide for optimum performance under varying flight conditions. The third unit functions as a light-off and blow-out detector to control the action of the second unit.

With the foregoing considerations in mind it is an important object of the present invention to provide novel pneumatic systems for controlling the position of the nozzle of a jet engine having the above-stated features and advantages over prior systems.

It is a further object of the invention to provide such systems which are relatively simple, compact and of light weight construction.

It is also an object of the present invention to provide improved jet engine nozzle control systems which offer rapid error-free response under all conditions under which jet engines are presently operational.

It is an additional object of the present invention to provide improved pneumatic jet engine nozzle control systems which position the jet nozzle to maintain a turbine pressure ratio which is cheduled as a function of the overall engine compression ratio.

It is also an important object of the present invention to provide improved pneumatic devices for sensing, indicating or controlling the ratio of the pressures of two fluids.

It is another object of the invention to provide improved pneumatic pressure sensitive devices which deliver an output signal in the form of a mechanical displacement, the magnitude of which is a function of the ratio of two applied input pressures and the strength of which is independent of the level of the input pressures.

Other objects and advantages will become apparent as the description proceeds in connection with the accompanying drawings in which:

FIGURE 3 is an enlarged top plan view of the control apparatus removed from the aircraft;

FIGURE 4 is a central vertical section of the apparatus of FIGURE 3;

FIGURE 5 is a transverse section taken along the line 5—5 of FIGURE 4; and

FIGURES 6 and 7 are fragmentary sections of modified forms of one component of the control apparatus of FIGURES 3–5.

Figure 1:
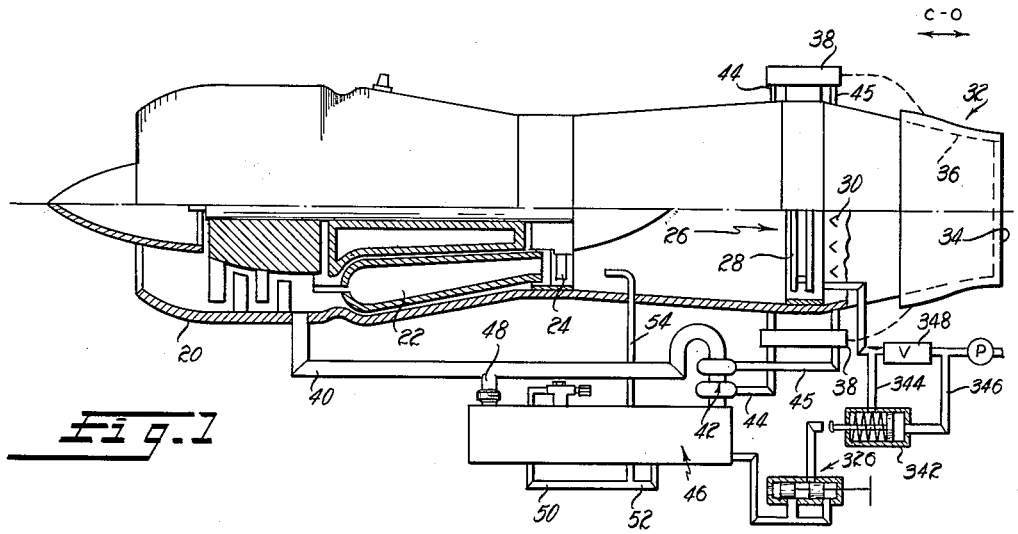
FIGURE 1 is a semi-diagrammatic view of a typical jet engine to which the control system of the present invention is applied.

Referring now more particularly to the drawings, the turbojet engine shown in FIGURE 1 is of conventional construction and includes the usual compressor 20, a primary burner 22, a turbine 24, and an afterburner assembly 26 including the fuel distributor 28 and flameholder grid 30 and a continuously variable area nozzle assembly 32. The nozzle assembly which may take the form shown for example in U.S. Patent No. 2,693,078, includes an axially movable shroud 34 and a plurality of nozzle flap elements 36 operatively connected to the shroud. The nozzle is moved toward closed position by movement of the shroud to the left as viewed in FIGURE 1 and to the open position by movement of the shroud to the right as viewed in FIGURE 1. The shroud 34 is positioned by a pair of opposed pneumatic actuators 38 which, in accordance with the present invention, are operated by air bled through a conduit 40 leading from the compressor discharge section of the engine and connected to the actuators through a servo-valve assembly 42 and pressure conduits 44 and 45. The valve 42 is so arranged that when it connects line 44 to the conduit 40, the nozzle is moved toward closed position and when conduits 45 and 40 are connected the nozzle is moved toward open position. The servo-valve 42 is controlled by a pressure sensitive mechanism indicated generally at 46 and shown in detail in the subsequent figures which forms the principal component of the nozzle control system of the present invention.

The pressure sensitive assembly 46 is dynamically connected to the engine by a branch line 48 connected to the conduit 40 carrying compressor discharge air and through branch conduits 50 and 52 leading to a pressure line 54 connected to the engine closely adjacent the downstream side of the turbine 24.

The pressure sensitive control assembly 46 includes three interrelated pressure sensitive units of the type illustrated diagrammatically in FIGURE 2 to which detailed reference will now be made.

Each of the pressure sensitive units includes several orifices as described in detail below. In certain cases the orifice must be of a particular configuration to produce the desired operation. In other cases the orifices may take one of a number of forms. Unless the particular configuration of the orifice is stated, it may be convergent, convergent-divergent, sharp edged or a drilled hole. In such cases the simplest orifice form is usually preferred. Drilled holes or other similar restrictions are used in certain sections of the apparatus where the overall accuracy of the control is relatively unaffected by the variations in the flow characteristics of the fluid through the orifices.

In general a convergent orifice is used when a relatively constant flow coefficient approaching unity is desired. This enhances the accuracy of the control over a wide range of operating conditions. A convergent-divergent orifice is generally used when the above conditions are required and also when it is desired to maintain choked operation of the orifice at the minimum possible pressure ratio thus increasing the overall range of operation to include lower overall pressure rations.

A sharp-edge orifice generally is used where a maximum variation of flow cofficients over the range of pressure ratios is desired. Novel results can be obtained by the use of orifices having relatively constant coefficients together with orifices having widely varying flow coefficients as explained below.

Figure 2:
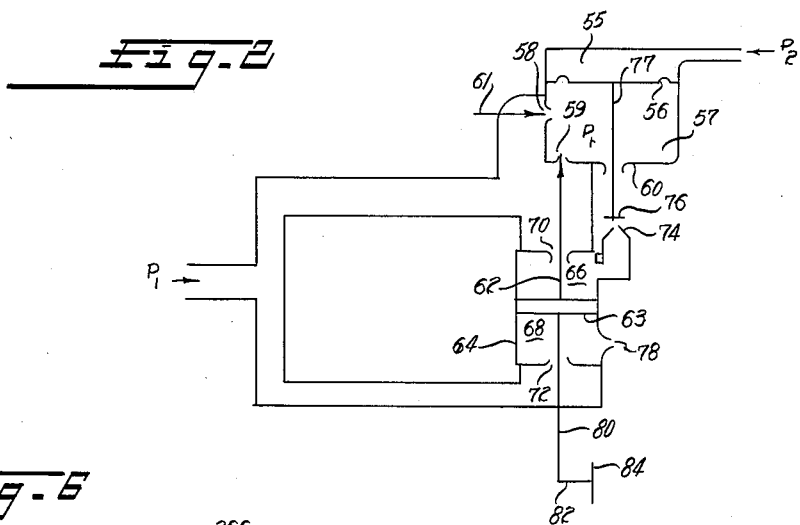
FIGURE 2 is a diagrammatic view of a component of the control system.

The unit illustrated in FIGURE 2 effectively measures, senses or indicates the ratio between two input pressures $P_1$ and $P_2$. The pressure $P_2$ is supplied to a static chamber 55 at the upper side of the flexible resilient diaphragm 56. The pressure $P_1$ is supplied to the upstream side of convergent orifices 58 and 59 leading into a flow chamber 57 formed at the under side of diaphragm 56. The diaphragm 56 is preferably metallic and has sufficient resilience that it will occupy a neutral position in the absence of a fluid pressure differential across it. The flow chamber 57 is connected to ambient pressure through convergent-divergent outlet orifice 60. A manually adjustable tapered needle 61 is provided for regulating the area of the inlet orifice 58 and a power actuated needle 62 rigid with a piston 63 effectively regulates the area of inlet orifice 59. The piston 63 is slidably mounted in a cylinder 64 divided by the piston into upper and lower flow chambers 66 and 68, respectively. The pressure $P_1$ is supplied to inlet orifices 70 and 72 of the chambers 66 and 68, respectively. The orifices 70 and 72 are of the same configuration and may be convergent, sharp-edged, or drilled holes. The chamber 66 is connected to ambient pressure through an outlet orifice 74, the effective area of which is regulated by a valve member 76 secured and movable with a rod 77 attached to the diaphragm 56. The flow chamber 68 is connected to ambient pressure through an outlet orifice 78 of fixed size. The unit of FIGURE 2 is completed by an indicator rod 80 rigid with the piston 63. If desired, the indicator rod 80 may be provided with a pointer 82 which cooperates with a fixed scale 84 to facilitate visual determination of the position of the indicator rod.

It can be demonstrated mathematically that the ratio of the pressure supplied to the inlet orifices of each of the flow chambers 66 and 68 to the pressure existing within the flow chambers is a function of the ratio between the area of the outlet orifices of the respective chambers to the area of the inlet orifice or orifices of the chambers when the orifices are choked. Reference may be had to copending application Serial No. 534,862 for a more complete discussion of this aspect of the invention.

In operation, assuming fluids under pressures $P_1$ and $P_2$ are supplied to the system, that the pressure $P_1$ is higher than the pressure $P_2$ and that the diaphragm 56 is in its neutral position by reason of its inherent spring characteristic or centering action, the pressure $P_R$ in chamber 57 equals pressure $P_2$. Also under these equilibrium conditions, assuming that the orifices 58, 59 and 60 are choked, the ratio of the area of orifice 60 to the sum of the areas of orifices 58 and 59 is such as to maintain the ratio of the pressures $P_R$ to $P_1$ equal to the ratio of the pressure $P_2$ to $P_1$.

Under these conditions the areas of orifices 70 and 74 and the area of orifices 72 and 78 are such as to produce equal pressures in the cylinder chambers 66 and 68. To produce this condition the area of orifice 70 need not equal the area of orifice 78. However the ratio of the area of orifice 70 to the area of orifice 74 must equal the ratio of the area of orifice 72 to the area of orifice 78.

If $P_2$ is increased a small amount, the diaphragm 56 will be deflected downwardly. Since the diaphragm is resilient its downward deflection will be proportional to the increase in the pressure $P_2$. The spring characteristic of the diaphragm is sufficiently low so that it exerts negligible effect on the overall performance of the unit but yet is high enough to provide the necessary proportionality. Any adverse effects of spring characteristics of the diaphragm are effectively minimized because of the limited deflection of the diaphragm as will appear. The spring characteristic of the diaphragm which produces a centering effect is particularly desirable since it produces stability of operation at low pressures such as may be encountered when the unit is used in connection with jet engine control at high altitudes.

Downward deflection of the diaphragm 56 moves the valve element 76 closer to the orifice 74 to restrict the effective area of the latter producing a pressure in cylinder chamber 66 which is higher than that in chamber 68. This differential pressure moves the piston 63 carrying the needle 62 and the indicator rod 80 downwardly as viewed in FIGURE 2. Thus, as soon as the piston 63 begins to move, the area of orifice 59 is increased thus changing the area ratio of the orifices in a direction to increase the pressure $P_R$ in chamber 50. This action continues until the pressures in chambers 55 and 57 become equal at which time the diaphragm, by virtue of the inherent centering spring force, returns to its neutral position thus returning the valve 76 to its original position and restoring the orifice 74 to its original area. This action equalizes the pressures in chambers 66 and 68 to reestablish equilibrium in the system at which all components are at rest.

In the new equilibrium condition diaphragm 56 occupies its neutral or original position while the piston 63 and the associated needle 62 and the indicator rod 80 occupy a corrected position. This new position corresponds to that which places the needle 62 in orifice 59 so as to maintain the pressure $P_R$ in chamber 57 equal to the new value of pressure $P_2$. At this condition the ratio of the pressure $P_R$ to $P_1$ is equal to the ratio $P_2$ to $P_1$, a condition which can be achieved at only one ratio of the combined area of orifices 58 and 59 to the area of orifice 60. Thus for each applied pressure ratio $P_2$ to $P_1$ there is a unique position of the indicator rod 80 as long as the orifice 60 is choked.

It is an important feature of the unit of FIGURE 2 that while the position of the indicator rod 80 and pointer 82 provides a direct indication of the ratio of the pressures $P_2$ and $P_1$, the force with which the rod 80 is moved is substantially greater than that produced by the differential pressure which displaces the diaphragm 56.

For example if the area of diaphragm 56 is 5 sq. in. and pressure $P_2$ is raised from 50 p.s.i. to 50.1 p.s.i. the resulting force effective to move the rod 77 is 0.5 pound. Assuming that under this pressure differential diaphragm 56 is deflected .005 inch to change the ratio of orifices 70 and 74 by 50% and further assuming that the pressure in cylinder chambers 66 and 68 is initially 60 p.s.i. then the pressure in chamber 66 will rise to 90 p.s.i. producing a 30 p.s.i. differential pressure acting on the piston 63. If the area of piston 63 is, for example, the same as the area of diaphragm 56 the resulting force effective to move the indicator rod 80 is 150 pounds. A force of this magnitude is sufficient to assure positive movement of the control rod 80 despite friction or the application of an external load to the rod 80. Accordingly the rod 80 may be used not only to indicate the ratio between pressures $P_1$ and $P_2$ but also to move system actuators or pneumatic or hydraulic valves precisely and positively in response to very slight changes in the levels of pressures $P_1$ and $P_2$.

As indicated above, the pressure sensitive control assembly 46 comprises 3 units of the type shown in FIGURE 2. The first of these units, indicated generally at 100 (FIGURE 4), effectively senses afterburner light-off and blow-out. The second unit, indicated generally at 102, senses the overall engine compression ratio and the third unit, indicated generally at 104, senses the turbine pressure ratio and directly controls the valve assembly 42 which is in the pneumatic circuit which energizes the nozzle actuators 38.

Structurally the pressure sensitive control assembly 46 comprises upper and lower sealed hollow manifold assemblies 106 and 108. Manifold 106 comprises an outer plate 110, an inner plate 112, end spacers 114 and side spacers 116 brazed or otherwise suitably secured together to form an air tight assembly. The manifold 106 is divided into two independent sealed ducts by a cross member 118. The manifold 108 is of similar construction comprising outer and inner plates 120 and 122, end spacers 124 and side spacers 126. The manifolds are held in assembled relation by a plurality of bolts 128 which draw the inner manifold plates 112 and 122 sealingly against the ends of four spaced cylinders 130, 132, 134 and 136. The conduit 48 varrying air bled from the discharge side of the compressor is connected to the assembly 46 by a fitting 138 leading into the interior of the manifold 106 and through the cylinder 130 to the manifold 108.

The afterburner light-off and blow-out sensing unit 100 is formed in part by a circular dish-shaped plate 140 secured to the outer manifold wall 120 by a plurality of stud and nut assemblies 142. A static chamber 143 is formed by an outer cover plate 144 suitably secured by stud and nut assemblies 146 to the outer surface of the plate 140. A thin sheet metal diaphragm 148 is sealingly clamped btween the plates 140 and 144, the adjacent surfaces of the plates being provided with conical recesses to accommodate limited movement of the diaphragm 148. The assembly is sealed by an O-ring 154 preferably of the pressurized hollow metal type. The outer plate 144 carries a fitting 156 connected to the branch conduit 50 which leads to the downstream side of the turbine. The convergent inlet orifice 158 of the flow chamber 159 of the unit 100 is formed in a fitting 160 press fitted or otherwise suitably secured to the manifold plate 120. A convergent-divergent outlet orifice 162 is formed in a member 164 mounted in a sleeve 166 suitably secured to the inner and outer manifold plates 122 and 120. The downstream side of the orifice 162 is in communication with the region between the cylinders 130 and 132 which is open to the atmosphere.

The diaphragm 148 carries a cylindrical needle 168 which extends into close proximity with a fitting 170 having a central passage 172 which is in communication through a passage 174 with a chamber 176, formed at the lower end of the cylinder 132. A piston 178 is slidably mounted in the cylinder 132 and carries control needles 180 and 182 which extend through suitable bearings 184 in the manifold plates 112 and 122. The needle 180 extends through the orifice 158 and is provided with an enlarged conical end portion 186 so arranged that upward movement of the piston 178 reduces the area of orifice 158 and downward movement of the piston increases the orifice area. The chamber 176 at the lower side of the piston 178 is connected to the interior of the manifold 108 through a convergent or sharp-edged orifice 188 and to atmospheric pressure through the passage 174 and the fitting 170. The chamber 190 above the piston 178 is connected to the interior of manifold 101 through an inlet orifice 192 similar to the orifice 188 and to ambient atmosphere through an outlet orifice 194.

The turbine pressure ratio sensing unit 104 is of essentially the same construction as the unit 100 and comprises an inner cover plate 196, an outer cover plate 198, diaphragm 200 forming one wall of the flow chamber 201 and the static chamber 203, control needle 202 and inlet and outlet orifiecs 204 and 206, respectively, which are preferably identical to the corresponding components of the unit 100. The control needle 202 regulates the flow of air out of a passage 208 in a fitting 210 connected through a passage 212 to the chamber 214 at the lower end of cylinder 136. A second inlet orifice 216 for the unit 104 is formed in an orifice member 218 mounted in manifold plate 120. The area of orifice 216 is controlled by a tapered needle 220 mounted in the bearing 222 and carried by a piston 224 slidably mounted in the cylinder 136. The chamber 226 in the cylinder 136 at the upper side of the piston 224 is connected to atmospheric pressure through openings 228 and 230 formed in the manifold walls 112 and 110, respectively.

The upper surface of the piston 224 is in direct contact with the lower end of the spool 232 of the valve assembly 42, the spool being slidably mounted in a cylinder 234 secured by stud and nut assemblies 236 to the manifold plate 110. Scrolls 238 and 240, connected to lines 45 and 44, respectively, are secured to the outer surface of the valve cylinder 234 in surrounding relation respectively with ports 242 and 244. The valve is provided with an additional set of vent ports 246 between the scrolls 238 and 240 and leading to the ambient atmosphere. At its upper end the valve is connected through a fitting 248 to the conduit 40 connected to the discharge side of the compressor. The valve spool 232 is provided with lands 250 and 252, which, in the position shown, are effective to close the ports 242 and 244. The spool 232 is also provided with a series of ports 254 below the land 252.

Accordingly when the valve spool 232 occupies the position shown the actuators 38 will be locked in position. If the valve spool is moved downwardly from the position shown the scroll 240 will be connected to exhaust through ports 246, and the scroll 238 will be connected to compressor discharge pressure through ports 242 moving the nozzle actuators to close the nozzle 32. Upward movement of the valve spool 232 from the position shown will connect the scroll 238 to exhaust and the scroll 240 to compressor discharge pressure thus moving the actuators 38 in the opposite direction to open the nozzle.

The construction of overall engine compression ratio sensor 102 is slightly different from the construction of the units 100 and 104 in that the chambers 256 and 258 formed at the opposite sides of the metallic diaphragm 260 are each flow chambers. The chamber 256 is formed in part by a cover plate 262 similar to the plates 140 and 196. Parallel inlet orifices 264 and 266 are formed in respective orifice members 268 and 270, mounted in the outer manifold plate 110. The orifice 264 is preferably a straight drilled hole while orifice 266 is convergent. The convergent-divergent outlet orifice 272 is formed in an assembly which is identical to corresponding components of the units 100 and 104. A straight control needle 274 extends through the outlet orifice 272 into close proximity with the end of a passage 276 in a fitting 278 connected by a passage 280 to the chamber 282 in cylinder 134 above the piston 284. The chamber 282 is connected to the manifold 106 through an inlet orifice 286 which is convergent or sharp-edged. The chamber 288 below piston 284 is provided with a similar inlet orifice 290 conected to the manifold 108 and an outlet orifice 292 connected to the ambient atmosphere. The piston 284 carries tapered control needles 294 and 296 projecting through bearings and respectively controlling the area of orifices 266 and 204. The needles are so constructed and arranged that upward movement of the piston 284 will reduce the area of both of the orifices while downward movement of the piston will increase the area of both of the orifices.

As shown in FIGURE 5 an additional convergent-divergent outlet orifice 298 formed in a member 300 carried by a sleeve 302 mounted in the manifold 106 connects the chamber 256 to the ambient atmosphere. The effective area of the orifice 298 is controlled by a manually adjustable needle 304 threaded into a fitting 306 sealingly mounted in the lower manifold 108. Similar adjustable outlet orifices, not shown, are provided for the units 100 and 104 to permit calibration of those units.

The chamber 258 at the upper side of the diaphragm 260 is formed in part by a housing 308 secured by stud and nut assemblies 310 to the upper surface of the cover plate 262. A hollow screw 312 in the head of which a sharp-edged outlet orifice 314 is formed is threaded into the neck portion of the housing 308. A convergent-divergent or sharp-edged inlet orifice 316 is formed in the housing 308.

The configuration of orifices 314 and 316 is selected to give maximum difference in aerodynamic characteristics as compared to orifices 266, 264, 272 and 298. The area of the orifice 316 is controlled by a needle 318 carried by a cap 320 threaded onto a portion of the housing 308 and arranged so that rotation of the cap 320 effectively adjusts the size of the orifice 316. The upstream side of the inlet orifice 316 is connected through a conduit 322 to a fitting 324 leading to the interior of the upper manifold 106. Thus compressor discharge pressure is supplied to the inlet orifices of both of the chambers 256 and 258 and the outlet orifices of these chambers are connected to ambient atmosphere.

The apparatus thus far described will function automatically to maintain a proper setting of the nozzle assembly 32 in a manner to be described in detail below. The system of the invention also comprises a manual override control and an associated control element effective to modify the performance of the unit and to open the nozzle slightly when after burning becomes imminent to reduce the violence of the initiation of afterburning.

The manual override control includes a valve assembly 326 connected to the chamber 214 at the lower side of a valve actuating piston 224 through a conduit 328 and branch lines 330 and 332. Also leading into the valve assembly 326 are conduits 334 and 336, the former leading to a source of compressor discharge pressure and the outlet end of the latter being controlled by a flapper valve 338. The valve 338 is connected to a piston 340 mounted in a cylinder 342 the opposite ends of which are connected by respective conduits 344 and 346 to the downstream and upstream sides of the afterburner fuel metering valve 348. A spring 350 biases the piston 340 and the valve 338 to the right, away from the outlet end of conduit 336 when the pressure differential between conduits 346 and 344 is below a predetermined amount.

Spool 352 of valve 326, which may be moved by a manual control lever 354 mounted at the pilot's station, is so arranged as to connect the line 328 to ambient atmosphere through branch line 330 while closing off conduit 334 and branch line 332 in a first position shown in dot dash lines in FIGURE 4, to connect branch line 332 to a source of compressor discharge pressure through conduit 334 while closing off branch line 330 and valved conduit 336 in a second position as shown in dotted lines in FIGURE 4, and to connect the branch line 332 to the valved conduit 336 while closing off conduit 334 and branch line 330 in a third position as shown in full lines in FIGURE 4.

In the first position of the valve spool 352 the connection of chamber 214 to exhaust permits the valve spool 232 to move downwardly to move the nozzle 32 to full closed position and to maintain it in this position under substantially full line pressure.

In the second position of the valve spool 352 the connection of chamber 214 to compressor discharge pressure raises the pressure in chamber 214 sufficiently regardless of the position of the needle 202 controlling the bleed passage 208 to move the valve spool 232 upwardly to thus move the nozzle to substantially full open position and maintain it in that position under full line pressure.

Movement of the valve spool 352 to the third or full line position connects the bleed line 328 to the valved exhaust line 336 and establishes full automatic operation of the system when the valve 338 is closed.

As stated above, the control apparatus of the present invention is designed primarily to position the nozzle during the afterburning cycle which includes the period just prior to the initiation of afterburning, afterburning operation and a period immediately subsequent to cessation of afterburning. Assuming that valve 326 is placed in its automatic position connecting chamber 214 to the valved exhaust line 336 and further assuming that the afterburner is not in operation the spring 350 will bias the valve 338 away from the adjacent end of the conduit 336 thus reducing the pressure in the chamber 214 to permit the valve spool 232 to move downwardly thus moving the nozzle assembly 32 to closed position.

During non-afterburning operation the turbine discharge pressure applied to the lower side of diaphragm 148 of the light-off and blow-out sensor 100 is at a value which is lower than that of the reference pressure maintained at the upper side of the diaphragm as determined by the effective areas of orifices 158 and 162. Accordingly the diaphragm is held in a downward position so that the needle 168 is moved away from the valve fitting 170 permitting substantially unrestricted flow through the passage 172 thus reducing the pressure below piston 178 and thereby fully opening the inlet orifice 264 in the overall engine compression ratio sensor 102.

As a result of this action the overall compression ratio sensor 102 is biased in a manner which reduces the pressure above its associated piston 284 causing the latter to be moved to the top of cylinder 134 thus substantially reducing the area of the inlet orifice 204 leading to the turbine pressure ratio sensor 104. The pressure in chamber 201 is then reduced and the diaphragm is thus biased upwardly to urge the control needle 202 against the valve fitting 208 whereby fluid can exhaust from chamber 214 below piston 224 solely through the valved conduit 336.

When the pilot desires to initiate afterburning the afterburner fuel and ignition are turned on. As soon as the differential fuel pressure across the afterburner fuel metering valve 348 rises to a sufficient value (approximately 30 p.s.i.) the piston 340 is displaced to the left preventing the exhaust of fluid through the conduit 336 and initiating automatic control of the jet nozzle. Since the overall engine compression ratio sensor 102 is locked in fixed position during non-afterburning operation the turbine pressure ratio sensing unit 104 controls the jet nozzle to a predetermined turbine pressure ratio corresponding to a partially open nozzle position. More specifically the effective area of inlet orifice 204 is at a fixed relatively small value because of the locked position of piston 284. The two outlet orifices are also of predetermined size so that equilibrium can be maintained in the unit 104 only when the needle 222 is moved to adjust the size of orifice 216 to establish a pressure above the diaphragm 200 equal to the turbine discharge pressure present below the diaphragm. In practice the area and configuration of the inlet and outlet orifices of the unit 104 are such that equilibrium conditions will be reached when the nozzle 32 is partially open to reduce the violence of the initiation of afterburning.

When the afterburner ignites, the turbine discharge pressure rises sharply and substantially instantaneously to a value greater than the preset reference pressure above the diaphragm 148 in the unit 100 thus displacing the diaphragm 148 upwardly closing the passage 172 thereby moving the piston 178 upwardly simultaneously closing inlet orifice 264 in the unit 102 and substantially reducing the area of orifice 158 in the unit 100. This action resets the reference pressure above diaphragm 148 to a lower value because of the reversely tapered configuration of the needle 180 so that the diaphragm 148 remains in its upward position even after the turbine ratio has been restored. The closing of inlet orifice 264 in the unit 102 permits subsequent automatic operation of this unit as a controller for the turbine pressure ratio sensor 104 by controlling the area of inlet orifice 204.

During afterburning the turbine pressure ratio senser 104 controls the jet nozzle 32 of the engine to maintain a prescheduled turbine pressure ratio determined by the value of the overall compression ratio as sensed by the unit 102. If the turbine discharge pressure rises, the diaphragm 200 of the unit 104 is displaced upwardly restricting the flow of air out of chamber 213 through the valve fitting 210 to move the piston 224 and the valve spool 232 upwardly to energize the nozzle actuators 38 in a nozzle closing direction. Simultaneously the reference pressure above diaphragm 200 is increased because of the taper of the needle 220 extending through inlet orifice 216. As the nozzle 32 is moved toward its corrected open position the turbine discharge pressure supplied to the lower side of diaphragm 200 will be reduced permitting the diaphragm 200 to return to its neutral position and returning the valve spool 232 to its neutral position to restore equilibrium conditions throughout the system with the nozzle 32 occupying a corrected position.

As the overall compression ratio changes during flight the turbine pressure ratio will be reset to a new value because of the change of position of the needle 296 within orifice 204 produced by the sensing and indicating action of the unit 102. By appropriate selection of the contour of the needle 296 any desired schedule of turbine pressure ratio versus overall compression ratio may be maintained to produce optimum performance in accordance with the known performance characteristics of a particular engine.

In the event of afterburner blow-out the turbine discharge pressure drops substantially instantaneously to a value below the value of the preset reference pressure on the upper side of diaphragm 148 in the afterburner light-off and blow-out sensor 100. Diaphragm 148 is thus displaced downwardly reducing the pressure in chamber 176 below the piston 178 to move the piston and the associated control needles downwardly. This action fully opens inlet orifice 264 in the unit 102 which, through action similar to that described above, restores the system to the position it occupied just prior to afterburner ignition in which position the nozzle 32 is moved to a partially open position. The jet nozzle 32 occupies this partly open position until re-ignition occurs or until the pilot returns the throttle to the non-afterburning position in which case the afterburner fuel is turned off and the resulting drop in pressure in line 346 permits the piston 340 and the associated valve member 338 to move to the right to reduce the pressure below piston 224 permitting downward movement of the valve spool 232 to energize the nozzle actuators 38 to move the nozzle 32 to fully closed position.

The system thus far described, in addition to providing fast and accurate control of the nozzle position, also has a number of other practical advantages. For example, an actual unit substantially as shown in the accompanying drawings has been constructed within the dimensional limitations required to permit it to fit within the envelope of a current jet engine so that it occupies only space previously not utilized within the aircraft. The total weight of the control system including provision for an overboard vent manifold is in the neighborhood of 17 pounds which compares very favorably with prior hydraulic or electrical systems.

Also the air flow requirements of the control system of the present invention are relatively small compared to the availability of compressor discharge air. For example, the total air consumption of the control section is in the neighborhood of .075 pound per second at a compressor discharge pressure of 100 p.s.i. absolute and at a compressor discharge temperature of 1000° F. The air flow is of course reduced as the compressor discharge pressure decreases at higher altitudes.

The air flow requirement for the actuators is determined by the actuator volume and displacement. Because of the possible interaction between the control unit and the actuator, separate and independent lines may be provided for these two units. Actual experience indicates that they are relativeIy free from malfunction caused by dirt or impurities in the air supply. For example such systems have been installed in engines which have been cleaned out by large quantities of ground walnut shells without producing a perceptible shift in calibration of the control unit.

The suitability of the control system for operation under high temperatures has been demonstrated by actual test by operation of the unit in an ambient temperature of 650° F. using compressor discharge air at 1020° F. Excellent high temperature performance is obtained because of the limited travel (a few thousandths of an inch) of the several diaphragms which permits the use of metallic diaphragms rather than the plastic diaphragms used in prior installations. Further, the operating pressure level is not a limiting factor since the diaphragms in general operate with low pressure differentials.

Several factors are responsible for the high degree of accuracy of the control system of the present invention. For example the diaphragms have relatively large areas so that even at high altitude operating conditions, significant actuating forces are available. Further, the use of the pistons 178, 284 and 224 which amplify the signals produced by the diaphragms produce a high degree of accuracy with quite large operating forces. Actual practice has shown that a pressure ratio error of as little as 0.5% will result in several pounds force to operate the main air valve assembly 42.

Figure 6:
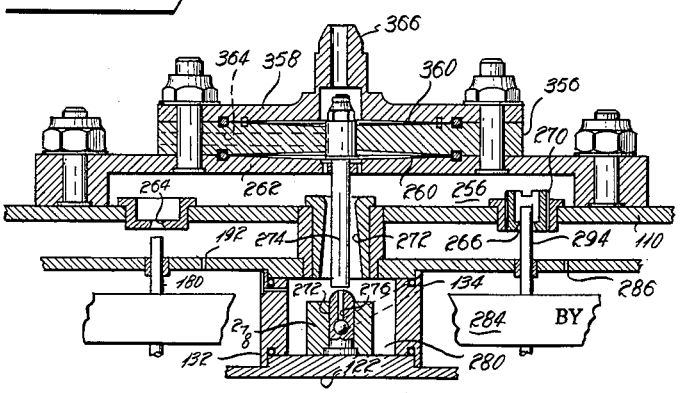

FIGURE 6, to which detailed reference will now be made, illustrates a modified form of the overall compression ratio sensing unit 102. With the exception of the elements located above the housing member 262, the modified unit of FIGURE 6 is identical with that shown in FIGURE 4. In the unit of FIGURE 6 the cover fitting 308 is replaced by a spacer 356 and a cover member 358. The opposite surfaces of the spacer 356 are provided with central conical depressions to accommodate the diaphragm 260 and an additional diaphragm 360, both of which are secured to the extended control needle 362, which replaces the needle 274. The spacer 360 is also provided with a lateral opening 364 which connects the conduit 322 to the space between the diaphragms 360 and 260. The space above the upper diaphragm 360 is connected to ambient pressure by a fitting 366 formed in the cover plate 358. It will be noted that the effective area of diaphragm 360 is considerably less than the effective area of diaphragm 260. The exact ratio of the two diaphragm areas is not critical and may vary within wide limits. In a typical case the area of diaphragm 260 may be twice that of diaphragm 360, so that the compressor discharge pressure supplied through conduit 322 will urge the two diaphragms downwardly in the absence of balancing pressures on the opposite sides of the diaphragms 260 and 360.

Assuming that the area of diaphragm 360 is one square inch, that the area of diaphragm 260 is two square inches, that the compressor discharge pressure is 100 p.s.i. and the ambient pressure is 10 p.s.i., the downward net force exerted on the diaphragm 260 will be such as to require a pressure of 55 p.s.i. in the chamber 256 to establish equilibrium. If, under these conditions, the ambient pressure is raised to 15 p.s.i. the needle 362 will be displaced downwardly, restricting the effective area of the passage 276 thereby increasing the pressure on the upper side of the piston 284 and moving needle 294 downwardly thus increasing the effective area of inlet orifice 266. The enlargement of orifice 266 raises the pressure in the chamber 256, in the specific example to 57½ p.s.i. and the diaphragm assembly will be returned to its equilibrium or neutral position and the piston 284 will come to rest. When these new equilibrium conditions are reached the needle 296 will occupy a position which corresponds to the prevailing value of the overall compression ratio. In this form of the invention the two diaphragms are used in order to increase the downward force acting on the diaphragm assembly above the value of ambient pressure which would be applied to the diaphragm 260 if the diaphragm 360 were omitted. This increase in the net downward force acting on the diaphragm 260 permits the use of pressures in chambers 256 which are sufficiently high to assure choking of the outlet orifice 272 which is essential to the successful operation of the subject device.

The modified unit shown in FIGURE 7 is identical with the unit 102 of FIGURE 4 except for the assembly 308 and the members associated therewith which are replaced by elements which will now be described in detail. In the apparatus of FIGURE 7 diaphragm 260 is clamped to the housing member 262 by cover member 368 an integral upward extension 370 of which supports an auxiliary housing 372. Formed within the housing 372 are upper and lower cylinders 374 and 376 preferably formed on the same axis. A flat circular plate 378 is positioned between the adjacent ends of the cylinders 374 and 376 and is provided with a central convergent orifice 380. Air from the outlet of the compressor is supplied through conduit 322 to the interior of cylinder 376 through an orifice 382 which may be convergent or which may take the form of a long capillary tube to compensate for Reynolds number effects. The housing 372 is connected to the ambient atmosphere through a plurality of openings 384.

In operation a reference pressure somewhat lower than the compressor discharge pressure is established in the chamber 386 at the upper side of diaphragm 260 by reason of the flow of air through the orifice 382 which forms the inlet to the chamber and the further orifice 388 formed between the plate 378 and the adjacent end of the cylinder 376. A second reference pressure is established in the chamber 390 formed between the inlet orifice 380 and the annular orifice 392 formed between the end of cylinder 374 and the plate 378. The rims of the cylindrical sections 274 and 278 are preferably chamfered or rounded so the nozzles 388 and 292 act as convergent nozzles. For a given value of the compressor discharge pressure supplied to the system and ambient pressure to which it exhausts there is a unique position of the plate 378 such that the reference pressures above and below the plate and the ambient pressure balance the plate where it is supported between two columns of air. It has been found desirable in order to improve the repeatability of the device to pivot the plate 378 by means of the lever 394 as shown. This construction also permits the use of counterweight 396 to offset any possible error produced by the weight of the plate 378.

The operation of this form of the device will be explained with reference to a specific example. Let it be assumed, for example, that a compressor discharge pressure of approximately 27 p.s.i. is applied to orifice 382, that ambient pressure is 1 p.s.i. and that the pressures above and below the plate 378 are such that the plate is in a free floating position. If the ambient pressure is increased to 1½ p.s.i. a net upward force is applied to the plate 378 causing the size of orifice 392 to be described and the size of orifice 388 to be increased. The resulting increase in the effective area of orifice 388 decreases the pressure in chamber 386. Depending upon the respective sizes of cylinders 374 and 376, the change in the pressure in chamber 386 resulting from a given change in the ambient pressure can be modified as desired. For example, if the ambient pressure changes ½ p.s.i. the pressure at the upper side of the diaphragm 260 may change as much as 1½ or 2 p.s.i. This action results in a substantial force on the diaphragm 260 which through the valve 278 and the piston 284 moves the needle 294 to a new position to vary the pressure below the diaphragm 260 to reestablish the position of the diaphragm 260 in its neutral position.

Because of the amplification of the change in pressure acting on the main diaphragm 260 for a given change in the ambient pressure or the compressor discharge pressure the embodiment of FIGURE 7 is preferred to the units of FIGURES 4 and 6.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

Apparatus for indicating the overall compression ratio of a jet engine having a compressor and a turbine comprising a housing, a pair of spaced diaphragms connected for co-movement in said housing, the space between said diaphragm forming a static chamber in said housing connected to the discharge side of said compressor, said one of said diaphragms being larger than the other, a static chamber formed by said housing and said other of said diaphragms and connected to ambient pressure, a flow chamber in communication with the outer side of said one diaphragm, said flow chamber having at least one sonic inlet orifice connected to the discharge side of said compressor and a sonic outlet orifice exhausting to ambient pressure, said orifices maintaining in said flow chamber a reference pressure in predetermined ratio with said compressor discharge pressure, an indicator element, means forming a pair of expansible chambers about opposite sides of said indicator element, each of said expansible chambers having an inlet opening adapted to be connected to a source of fluid under pressure and an outlet opening, means movable with said diaphragms for varying the area of one of said openings in one of said expansible chambers to thereby vary the pressure in said one expansible chamber to move said indicator element when said diaphragms are displaced, and means movable with said indicator element for varying the area of one of said orifices in said flow chamber whereby said indicator will come to rest when said diaphragms are balanced.

References Cited in the file of this patent

UNITED STATES PATENTS

| | | |
|---|---|---|
| 2,565,854 | Johnstone et al. | Aug. 28, 1951 |
| 2,600,073 | Plank | June 10, 1952 |
| 2,632,474 | Jones | Mar. 24, 1953 |
| 2,677,233 | Jordan | May 4, 1954 |
| 2,737,016 | Day | Mar. 6, 1956 |
| 2,746,242 | Reed | May 22, 1956 |
| 2,757,511 | Jagger | Aug. 7, 1956 |
| 2,804,084 | Greenland | Aug. 27, 1957 |
| 2,818,703 | Victor | Jan. 7, 1958 |
| 2,858,700 | Rose | Nov. 4, 1958 |
| 2,925,710 | Gavin | Feb. 23, 1960 |

FOREIGN PATENTS

| | | |
|---|---|---|
| 874,370 | France | May 4, 1942 |
| 278,689 | Germany | Oct. 2, 1914 |

OTHER REFERENCES

"A New Approach to Turbojet and Ramjet Engine Control" by Reed, a paper presented at the S.A.E. Golden Anniversary Aeronautic Meeting, Los Angeles, Oct. 14, 1955, reprinted in SAE Transactions, vol. 64, 1956, pages 472–485.